US012011882B1

(12) United States Patent
Fan et al.

(10) Patent No.: US 12,011,882 B1
(45) Date of Patent: Jun. 18, 2024

(54) PATH PLANNING METHOD BASED ON DYNAMIC CONTOUR OFFSET DISCRETIZATION AND FOR SPATIAL CURVED-SURFACE PRINTING

(71) Applicant: NANJING UNIVERSITY OF AERONAUTICS AND ASTRONAUTICS, Nanjing (CN)

(72) Inventors: Congze Fan, Nanjing (CN); Wenzhe Song, Nanjing (CN); Zhongde Shan, Nanjing (CN); Yiwei Chen, Nanjing (CN); Jinghua Zheng, Nanjing (CN); Yaxing Song, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/520,581

(22) Filed: Nov. 28, 2023

Related U.S. Application Data

(63) Continuation of application No. PCT/CN2023/077082, filed on Feb. 20, 2023.

(30) Foreign Application Priority Data

Jan. 5, 2023 (CN) .......................... 202310015185.2

(51) Int. Cl.
*G06T 15/00* (2011.01)
*B29C 64/393* (2017.01)
*B33Y 50/02* (2015.01)
*G06F 30/10* (2020.01)
*G06F 113/10* (2020.01)

(52) U.S. Cl.
CPC ............ *B29C 64/393* (2017.08); *B33Y 50/02* (2014.12); *G06F 30/10* (2020.01); *G06F 2113/10* (2020.01)

(58) Field of Classification Search
CPC .............................. B29C 64/386; B33Y 50/00
(Continued)

(56) References Cited

U.S. PATENT DOCUMENTS

| 5,596,504 | A | | 1/1997 | Tata et al. |
| 9,254,535 | B2 | * | 2/2016 | Buller ................... B22F 10/28 |

(Continued)

FOREIGN PATENT DOCUMENTS

| CN | 108320327 | A | | 7/2018 | |
| CN | 110126279 | A | * | 5/2019 | ........... B29C 64/393 |
| CN | 110126279 | A | | 8/2019 | |

OTHER PUBLICATIONS

Chen Q, Xu J, Zhang S. Cylindricity and flatness optimization for mechanical parts in additive manufacturing based on tolerance adaptive slicing. The International Journal of Advanced Manufacturing Technology. Aug. 2021;115:3839-57.*

(Continued)

*Primary Examiner* — Phu K Nguyen
(74) *Attorney, Agent, or Firm* — Bayramoglu Law Offices LLC

(57) ABSTRACT

A path planning method based on dynamic contour offset discretization and for spatial curved-surface printing is provided. Firstly, transversal equal slicing is carried out on a target model, and single/double contours are labeled; secondly, central slicing is carried out on the model, curvature contours are discretized, feature values of contour offsets of slice layers are calculated on the basis of a surface contour curvature of the model, and dynamic offset filling for inner contours of horizontal slices is realized; then longitudinal equal slicing is carried out on the slices, and spatial discrete points of the target model are obtained; and finally, virtual double contours are constructed for the single contours, and labeling processing for the discrete points is carried out, so (Continued)

that a discretized three-dimensional spatial equidistant lattice of the target model is obtained.

5 Claims, 2 Drawing Sheets

(58) Field of Classification Search
USPC .......................................................... 345/418
See application file for complete search history.

(56) References Cited

U.S. PATENT DOCUMENTS

| | | | | |
|---|---|---|---|---|
| 9,962,767 | B2 * | 5/2018 | Buller | B23K 26/144 |
| 10,872,177 | B2 * | 12/2020 | Gupta | G06F 30/00 |
| 11,465,357 | B2 * | 10/2022 | Davis | B29C 64/393 |
| 11,548,228 | B2 * | 1/2023 | Tastl | G06F 30/20 |
| 11,656,602 | B2 * | 5/2023 | Mirzendehdel | G06F 30/10 |
| | | | | 700/97 |
| 2023/0030783 | A1 * | 2/2023 | Urick | G05B 19/4099 |

OTHER PUBLICATIONS

Robles-Lorite L, Dorado-Vicente R, García-Collado A, Torres-Jimenez E. Procedure to improve the surface fidelity of additive manufactured parts via direct slicing tessellation. Expert Systems with Applications. May 15, 2024;242:122822.*

Jin Ya, He Y, Fu Jz. Support generation for additive manufacturing based on sliced data. International Journal of Advanced Manufacturing Technology. Oct. 1, 2015;80.*

* cited by examiner

| Labels of slice layers | Starting label of inner contours |
|---|---|
| ⋮ | 1 |
| k-1 | 1 |
| k | 2 |
| k+1 | 3 |
| ⋮ | ⋮ |

PATH PLANNING METHOD BASED ON DYNAMIC CONTOUR OFFSET DISCRETIZATION AND FOR SPATIAL CURVED-SURFACE PRINTING

CROSS REFERENCE TO THE RELATED APPLICATIONS

This application is the continuation application of International Application No. PCT/CN2023/077082, filed on Feb. 20, 2023, which is based upon and claims priority to Chinese Patent Application No. 202310015185.2, filed on Jan. 5, 2023, the entire contents of which are incorporated herein by reference.

TECHNICAL FIELD

The present invention belongs to the technical field of advanced manufacturing, and especially relates to a path planning method based on dynamic contour offset discretization and for spatial curved-surface printing, where spatial curved-surface printing may be realized in combination with a multi-degree-of-freedom printing device.

BACKGROUND

In a traditional additive manufacturing technology (3D printing), planar layering and slicing are mostly adopted, and layer-by-layer stacking forming is carried out. The core idea is to reduce a three-dimensional model to a two-dimensional plane for forming and manufacturing. However, when coping with forming for multi-curvature complex components, the forming precision is greatly affected by an inherent interlayer staircase effect of planar layering, and the mechanical performance of the curved-surface components in service are reduced due to poor interlayer bonding property. During 3D printing for conventional thermoplastic materials, the above effect may be reduced as much as possible by reducing a layer thickness. However, continuous fiber-reinforced thermoplastic composite materials are limited by reinforced fibers and have relatively-fixed set values of a layer thickness, so that if the manner of planar layering and slicing is adopted, the application scenarios of the materials in additive manufacturing for components are greatly limited. Therefore, development for an additive manufacturing technology based on curved-surface layering has a great production application value.

With the development of the robotics, multi-degree-of-freedom printing gradually becomes a research hot-spot direction at home and abroad, and also provides a hardware basis for path planning for spatial curved-surface printing. The patent discloses a path planning method based on dynamic contour offset discretization and for spatial curved-surface printing, where overall discretization is carried out on a target model, and path planning for spatial curved-surface layering is realized on the basis of a position relationship of discrete points. The method provides a new thought of spatial curved-surface path planning for multi-degree-of-freedom printing for complex curved-surface structures.

SUMMARY

In order to solve the above problems, the present invention discloses a path planning method based on dynamic contour offset discretization and for spatial curved-surface printing, and aims to improve limitations of path planning for planar slicing of traditional 3D printing in Z-directional mechanical performance and surface quality of formed components.

A path planning method based on dynamic contour offset discretization and for spatial curved-surface printing, the path planning method comprising the following steps:

step 1: identifying shape features of a target model, wherein the shape features comprise the spatial length, width, and height boundary feature information of the model;

step 2: setting a feature layer thickness value t of transversal equal slicing, carrying out equal slicing on the target model in a height direction from bottom to top by the value t, and sequentially labeling slices as a "slice 1", a "slice 2", . . . , a "slice n", . . . wherein the feature layer thickness value is a target printing layer thickness value, which is a curved-surface printing layer thickness under the path planning method;

step 3: classifying and identifying the number of contour boundaries for the slices, and labeling critical slices with double/single contours, wherein the last double contour belongs to a "slice k−1", and the first single contour belongs to a "slice k", and from bottom to top, sequentially labeling the slices as a "slice 1", a "slice 2", . . . , a "slice k−1", a "slice k", . . . , a "slice n", . . . ;

step 4: carrying out central slicing on the target model, carrying out contour intersection with the horizontal slices in the steps 2 to 3 to obtain discrete points of a contour curve of the model, obtaining contour curvature information of the model, and from bottom to top, sequentially labeling the discrete points as a "discrete point 1", a "discrete point 2", . . . , a "discrete point n", . . . , in a manner of corresponding to the label numbers of the slices;

step 5: connecting the "discrete point n−1" and the "discrete point n" in pairs, calculating an outer normal vector of a perpendicular bisector of the "discrete point n−1" and the "discrete point n" within a central slicing surface, assigning information of the vector to the "discrete point n−1", and repeating to obtain uncorrected normal directions of the discrete points; carrying out vector synthesis on the normal directions of the two points "discrete point n−1" and "discrete point n+1" in front of and behind the "discrete point n" to obtain approximately real corrected normal directions of the discrete points; and solving outer deflection angles between the normal directions of the discrete points within the central slicing surface and the horizontal slices where the points are located, and from bottom to top, sequentially labeling the outer deflection angles as a "deflection angle theta 1", a "deflection angle theta 2", . . . , a "deflection angle theta n", . . . in a manner of corresponding to the label numbers of the slices;

step 6: on the basis of the solved contour curvature information of an outer surface in the step 5, solving feature values dn=t/cos(theta n) of contour offsets of the horizontal slices, and realizing dynamic adjustment for the feature values of the contour offsets of the layers;

step 7: according to the labels of the double/single contours in the steps 2 to 3, carrying out equidistant offset filling on the double contours from inner contours to the outside, carrying out equidistant offset filling on the single contours from the outside to the inside, determining the feature values dn of the contour offsets of the layers in the step 6, and from the outside to the inside, sequentially labeling the contours as a "contour 1", a "contour 2", . . . , a "contour j", . . . ;

step 8: setting a longitudinal equal cutting distance dis for a section, carrying out longitudinal cutting for the section on the target model within a width direction range by the value dis, from left to right, sequentially labeling cutting surfaces as a "cutting surface 1", a "cutting surface 2", . . . , a "cutting surface m", . . . , and enabling the longitudinal cutting surfaces to be intersected with the horizontal slices which are subjected to the dynamic contour offset filling in the step 7 to obtain spatial discrete points of the target model;

step 9: according to the labels of the double/single contours in the steps 2 to 3, constructing virtual double contours for the slices with the single contours, as shown in FIG. 1, and within a series of the cutting surfaces containing the single contours, on the basis of a distance ratio of the inner/outer boundary discrete points of the critical "slice k−1" with the last double contour, selecting the inner discrete points to construct virtual inner contours by taking distances of the outer boundary discrete points of the single contours as the benchmark;

step 10: for the labels of the spatial discrete points of the target model, introducing a relative position variable 0/1, and symmetrically labeling the discrete points within the cutting surfaces, wherein the rule for a starting label "i" of the inner boundary discrete points is "when the slice label is not greater than k−1, the starting label of the inner boundary discrete points is 1, and the subsequent labels continue to increase as the slice label increases", and as shown in FIG. 2, sequentially labeling the discrete points as "0| . . . ", "0|r", "0| . . . ", "0|i+1", "0|i"; "1|i", "1|i+1", "1| . . . ", "1|r", and "1| . . . ";

step 11: on the basis of the above steps 1 to 10, discretizing a three-dimensional spatial equidistant lattice [n, j, m, 0/1, r] for the target model, and independently labeling any one discrete point, with unrepeated labeling information; and step 12: sequentially connecting the discrete points labeled with the same value r within a single cutting surface to obtain a spatial curve within the single cutting surface; under the labeling with the same value r, connecting the spatial curves within the cutting surfaces end to end in the order of the value m of the section to obtain single-layer spatial curved surfaces, with a filling mode of "zigzag"; and connecting the single-layer spatial curved surfaces end to end in the order of the value r, and stacking layer by layer to obtain an overall spatial curved-surface path of the target model.

Furthermore, the target model in the step 1 is a CAD model, in an STL format for example, which contains surface contour information of the target model.

Furthermore, the number of the transversal equal slices, the number of the longitudinal equal cutting surfaces for the section, and the number of the discrete points on intersection lines in the steps 2 to 9 are integers, and are all rounded downwards.

Furthermore, the longitudinal cutting surfaces in the step 8 form included angles with a front view surface of the target model, the angles determine printing layout directions within the single-layer spatial curved surfaces, and in order to realize relative transformations of the layout directions within the spatial curved surface of the layers, the values of the angles may be independently set in a manner of corresponding to the spatial curved surface layers.

Furthermore, a discretization degree of the target model is determined by t and dis, and the smaller the values, the higher the discretization degree of the model and the higher the precision.

The present invention has the following beneficial effects:

1. according to the above path planning method based on dynamic contour offset discretization and for spatial curved-surface printing, which is provided by the present invention, dimensional staircase errors and service performance loss brought by adopting traditional planar slicing for continuous fiber-reinforced composite materials to cope with complex curved-surface components, may be improved;
2. according to the method, dynamic contour offsets are adopted, and may guarantee the consistency of a layer thickness of a curved surface compared with equidistant contour offsets, so that the dimensional precision is further improved; and
3. the method provides a new thought of spatial curved-surface path planning for multi-degree-of-freedom printing for complex curved-surface structures.

DETAILED DESCRIPTION OF THE EMBODIMENTS

Figure 1:
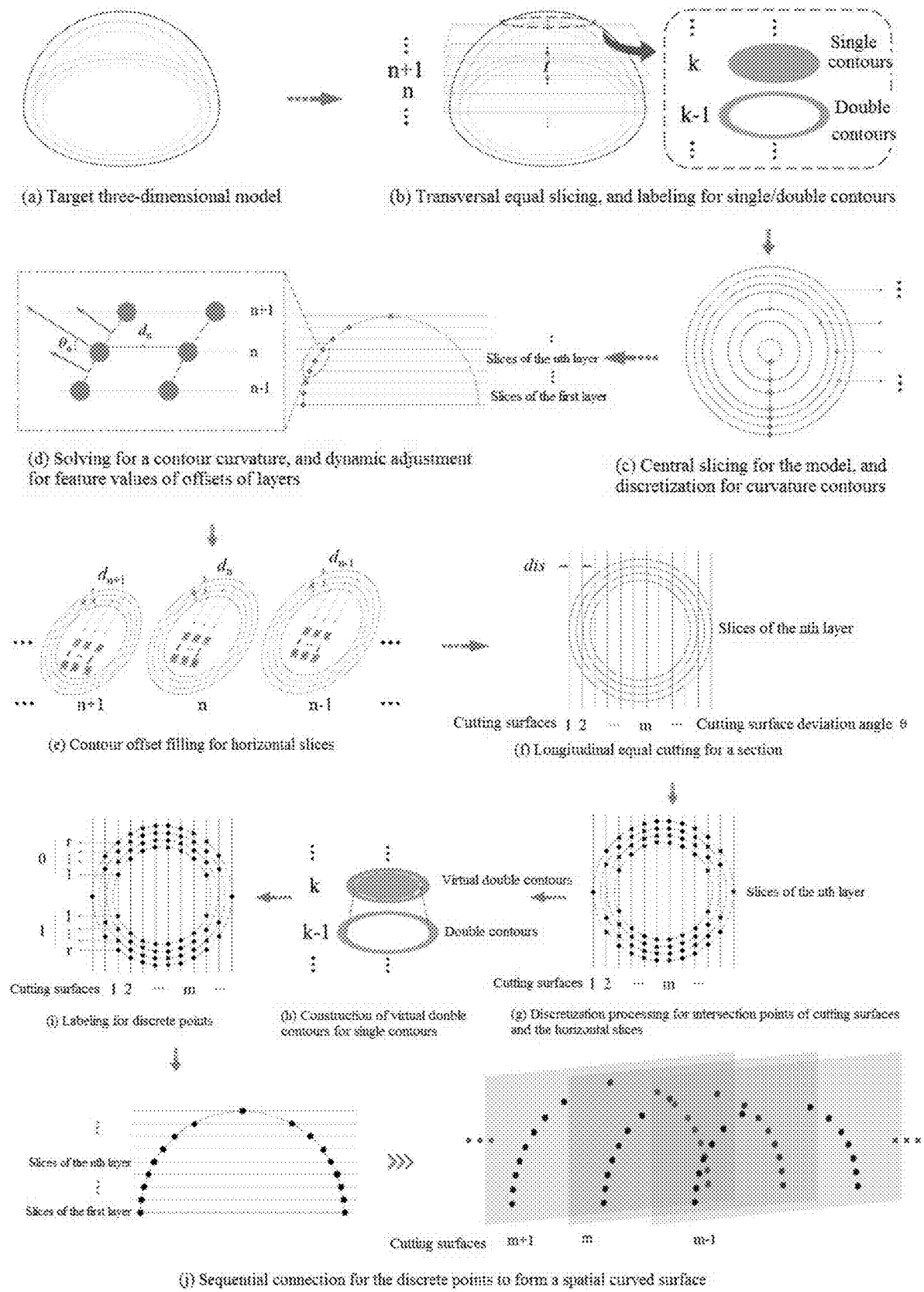
FIG. 1 is a schematic flow diagram of a path planning method based on dynamic discretization and for spatial curved-surface printing; (a) target three-dimensional model; (b) transversal equal slicing; (c) central slicing for the model; (d) solving for a contour curvature; (e) contour offset filling for horizontal slices; (f) longitudinal equal cutting for a section; (i) labeling for discrete points; (h) construction of virtual double contours for single contours; (g) discretization processing for intersection points of cutting surfaces and the horizontal slices.

The present invention is further illustrated below in conjunction with the drawings and specific implementation manners, and it should be understood that the following specific implementation manners are merely used for describing the present invention and not to limit the scope of the present invention. It needs to be noted that, the words "front", "back", "left", "right", "upper", and "lower" used in the following description refer to directions in the drawings, and the words "inside" and "outside" respectively refer to directions toward or away from the geometric center of a particular component.

Figures 2, 3:
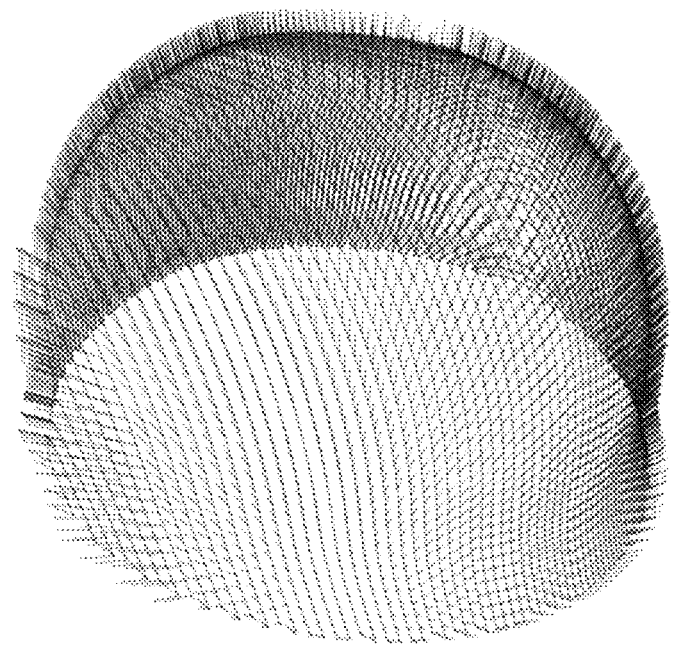
FIG. 2 shows the rule for a starting label "i" of inner boundary discrete points.
FIG. 3 is an effect diagram of single-layer curved-surface paths and normal directions of the discrete points in specific examples.

A path planning method based on dynamic contour offset discretization and for spatial curved-surface printing in the example includes the following steps:

step 1: determining a target model as a helmet, and identifying shape features of the helmet model, where the shape features include the spatial length, width, and height boundary feature information of the model, the length is 73.9 mm, the width is 81.2 mm, and the height is 40.8 mm;

step 2: setting a feature layer thickness value t of transversal equal slicing to be equal to 0.52 mm, carrying out equal slicing on the target model in a height direction from bottom to top by the value t, and sequentially labeling slices as a "slice 1", a "slice 2", . . . , a "slice n", . . . ;

step 3: classifying and identifying the number of contour boundaries for the slices, and labeling critical slices with double/single contours (the last double contour belongs to a "slice k−1", and the first single contour belongs to a "slice k"), and from bottom to top, sequentially labeling the slices as a "slice 1", a "slice 2", . . . , a "slice k−1", a "slice k" . . . . A "slice n", . . . ;

step 4: carrying out central slicing on the target model, carrying out contour intersection with the horizontal slices in the steps 2 to 3 to obtain discrete points of a contour curve of the model, obtaining contour curvature information of the model, and from bottom to top, sequentially labeling the discrete points as a "discrete point 1", a "discrete point 2", . . . , a "discrete point n", . . . in a manner of corresponding to the label numbers of the slices;

step 5: connecting the "discrete point n−1" and the "discrete point n" in pairs, calculating an outer normal vector of a perpendicular bisector of the "discrete point n−1" and the "discrete point n" within a central slicing surface, assigning information of the vector to the "discrete point n−1", and repeating to obtain uncorrected normal directions of the discrete points; carrying out vector synthesis on the normal directions of the two points "discrete point n−1" and "discrete point n+1" in front of and behind the "discrete point n" to obtain approximately real corrected normal directions of the discrete points;

and solving outer deflection angles between the normal directions of the discrete points within the central slicing surface and the horizontal slices where the points are located, and from bottom to top, sequentially labeling the outer deflection angles as a "deflection angle theta 1", a "deflection angle theta 2", . . . , a "deflection angle theta n", . . . in a manner of corresponding to the label numbers of the slices;

step 6: on the basis of the solved contour curvature information of an outer surface in the step 5, solving feature values dn=t/cos(theta n) of contour offsets of the horizontal slices, and realizing dynamic adjustment for the feature values of the contour offsets of the layers;

step 7: according to the labels of the double/single contours in the steps 2 to 3, carrying out equidistant offset filling on the double contours from inner contours to the outside, carrying out equidistant offset filling on the single contours from the outside to the inside, determining the feature values dn of the contour offsets of the layers in the step 6, and from the outside to the inside, sequentially labeling the contours as a "contour 1", a "contour 2", . . . , a "contour j", . . . ;

step 8: setting a longitudinal equal cutting distance dis for a section to be equal to 1 mm, carrying out longitudinal cutting for the section on the target model within a width direction range by the value dis, from left to right, sequentially labeling cutting surfaces as a "cutting surface 1", a "cutting surface 2", . . . , a "cutting surface m", . . . , and enabling the longitudinal cutting surfaces to be intersected with the horizontal slices which are subjected to the dynamic contour offset filling in the step 7 to obtain spatial discrete points of the target model;

step 9: according to the labels of the double/single contours in the steps 2 to 3, constructing virtual double contours for the slices with the single contours, as shown in FIG. 1, and within a series of the cutting surfaces containing the single contours, on the basis of a distance ratio of the inner/outer boundary discrete points of the critical "slice k−1" with the last double contour, selecting the inner discrete points to construct virtual inner contours by taking distances of the outer boundary discrete points of the single contours as the benchmark;

step 10: for the labels of the spatial discrete points of the target model, introducing a relative position variable 0/1, as shown in FIG. 2; and symmetrically labeling the discrete points within the cutting surfaces, where the rule for a starting label "i" of the inner boundary discrete points is "when the slice label is not greater than k−1, the starting label of the inner boundary discrete points is 1, and the subsequent labels continue to increase as the slice label increases";

step 11: on the basis of the above steps 1 to 10, discretizing a three-dimensional spatial equidistant lattice [n, j, m, 0/1, r] for the target model, and independently labeling any one discrete point, with unrepeated labeling information; and step 12: sequentially connecting the discrete points labeled with the same value r within a single cutting surface to obtain a spatial curve within the single cutting surface; under the labeling with the same value r, connecting the spatial curves within the cutting surfaces end to end in the order of the value m of the section to obtain single-layer spatial curved surfaces, with a filling mode of "zigzag", and FIG. 3 is an effect diagram of single-layer curved-surface paths and normal directions of the discrete points; and connecting the single-layer spatial curved surfaces end to end in the order of the value r, and stacking layer by layer to obtain an overall spatial curved-surface path of the target model.

The technical means disclosed by the solution of the present invention are not merely limited to the technical means disclosed in the above implementation manners, but also include technical solutions composed of any combination of the above technical features.

What is claimed is:

1. A path planning method based on dynamic contour offset discretization and for spatial curved-surface printing, comprising the following steps:

step 1: identifying shape features of a target model, wherein the shape features comprise spatial length, width, and height boundary feature information of the model;

step 2: setting a feature layer thickness value t of transversal equal slicing, carrying out equal slicing on the target model in a height direction from bottom to top by the value t, and sequentially labeling slices as a "slice 1", a "slice 2", . . . , a "slice n", . . . , wherein the feature layer thickness value is a target printing layer thickness value, which is a curved-surface printing layer thickness;

step 3: classifying and identifying the number of contour boundaries for the slices, and labeling critical slices with double/single contours, wherein the last double contour belongs to a "slice k−1", and the first single contour belongs to a "slice k", and from bottom to top, sequentially labeling the slices as a "slice 1", a "slice 2", . . . , a "slice k−1", a "slice k", . . . , a "slice n", . . . ;

step 4: carrying out central slicing on the target model, carrying out contour intersection with the horizontal slices in the steps 2 to 3 to obtain discrete points of a contour curve of the model, obtaining contour curvature information of the model, and from bottom to top, sequentially labeling the discrete points as a "discrete point 1", a "discrete point 2", . . . , a "discrete point n", . . . in a manner of corresponding to the label numbers of the slices;

step 5: connecting the "discrete point n−1" and the "discrete point n" in pairs, calculating an outer normal vector of a perpendicular bisector of the "discrete point n−1" and the "discrete point n" within a central slicing surface, assigning information of the vector to the "discrete point n−1", and repeating to obtain uncorrected normal directions of the discrete points; carrying out vector synthesis on the normal directions of the two points "discrete point n−1" and "discrete point n+1" in front of and behind the "discrete point n" to obtain approximately real corrected normal directions of the discrete points; and solving outer deflection angles between the normal directions of the discrete points within the central slicing surface and the horizontal slices where the points are located, and from bottom to top, sequentially labeling the outer deflection angles as a "deflection angle theta 1", a "deflection angle theta 2", . . . , a "deflection angle theta n", . . . in a manner of corresponding to the label numbers of the slices;

step 6: on the basis of the solved contour curvature information of an outer surface in the step 5, solving feature values dn=t/cos(theta n) of contour offsets of the horizontal slices, and realizing dynamic adjustment for the feature values of the contour offsets of the layers;

step 7: according to the labels of the double/single contours in the steps 2 to 3, carrying out equidistant offset filling on the double contours from inner contours to the outside, carrying out equidistant offset filling on the single contours from the outside to the inside, determining the feature values dn of the contour offsets of the layers in the step 6, and from the outside to the inside, sequentially labeling the contours as a "contour 1", a "contour 2", . . . , a "contour j", . . . ;

step 8: setting a longitudinal equal cutting distance dis for a section, carrying out longitudinal cutting for the section on the target model within a width direction range by the value dis, from left to right, sequentially labeling cutting surfaces as a "cutting surface 1", a "cutting surface 2", . . . , a "cutting surface m", . . . , and enabling the longitudinal cutting surfaces to be intersected with the horizontal slices which are subjected to the dynamic contour offset filling in the step 7 to obtain spatial discrete points of the target model;

step 9: according to the labels of the double/single contours in the steps 2 to 3, constructing virtual double contours for the slices with the single contours, and within a series of the cutting surfaces containing the single contours, on the basis of a distance ratio of the inner/outer boundary discrete points of the critical "slice k−1" with the last double contour, selecting the inner discrete points to construct virtual inner contours by taking distances of the outer boundary discrete points of the single contours as the benchmark;

step 10: for the labels of the spatial discrete points of the target model, introducing a relative position variable 0/1, and symmetrically labeling the discrete points within the cutting surfaces, wherein the rule for a starting label "i" of the inner boundary discrete points is "when the slice label is not greater than k−1, the starting label of the inner boundary discrete points is 1, and the subsequent labels continue to increase as the slice label increases", sequentially labeling the discrete points as "0| . . . ", "0|r", "0| . . . ", "0|i+1", "0|i"; "1|i", "1|i+1", "1| . . . ", "1|r", and "1| . . . ";

step 11: on the basis of the above steps 1 to 10, discretizing a three-dimensional spatial equidistant lattice [n, j, m, 0/1, r] for the target model, and independently labeling any one discrete point, with unrepeated labeling information; and step 12: sequentially connecting the discrete points labeled with the same value r within a single cutting surface to obtain a spatial curve within the single cutting surface; under the labeling with the same value r, connecting the spatial curves within the cutting surfaces end to end in the order of the value m of the section to obtain single-layer spatial curved surfaces; and connecting the single-layer spatial curved surfaces end to end in the order of the value r, and stacking layer by layer to obtain an overall spatial curved-surface path of the target model.

2. The path planning method based on dynamic contour offset discretization and for spatial curved-surface printing according to claim 1, wherein the number of the transversal equal slices, the number of the longitudinal equal cutting surfaces for the section, and the number of the discrete points on intersection lines in the steps 2 to 9 are integers.

3. The path planning method based on dynamic contour offset discretization and for spatial curved-surface printing according to claim 1, wherein the longitudinal cutting surfaces in the step 8 included angles with a front view surface of the target model, the angles determine printing layout directions within the single-layer spatial curved surfaces, and in order to realize relative transformations of the layout directions within the spatial curved surface of the layers, the values of the angles are independently set in a manner of corresponding to the spatial curved surface layers.

4. The path planning method based on dynamic contour offset discretization and for spatial curved-surface printing according to claim 1, wherein a discretization degree of the target model is determined by the t and the dis, and the smaller the t and the dis, the higher the discretization degree of the model and the higher the precision.

5. The path planning method based on dynamic contour offset discretization and for spatial curved-surface printing according to claim 1, wherein the target model in the step 1 is a CAD model, which contains surface contour information of the target model.

* * * * *